US012755975B2

(12) United States Patent
Frieberg et al.

(10) Patent No.: US 12,755,975 B2
(45) Date of Patent: Oct. 6, 2026

(54) ANODE ELECTRODE WITH ANODE ACTIVE MATERIAL LAYER INCLUDING LITHIUM SILICON OXIDE OR SILICON OXIDE AND STYRENE BUTADIENE RUBBER

(71) Applicant: GM GLOBAL TECHNOLOGY OPERATIONS LLC, Detroit, MI (US)

(72) Inventors: Bradley R. Frieberg, Farmington Hills, MI (US); Anita Li, Ann Arbor, MI (US); Roland J. Koestner, Webster, NY (US); Xiaosong Huang, Novi, MI (US); Taylor Syring, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 633 days.

(21) Appl. No.: 18/341,937

(22) Filed: Jun. 27, 2023

(65) Prior Publication Data

US 2025/0006935 A1 Jan. 2, 2025

(51) Int. Cl.
*H01M 4/62* (2006.01)
*H01M 4/02* (2006.01)
(Continued)

(52) U.S. Cl.
CPC ........... *H01M 4/622* (2013.01); *H01M 4/133* (2013.01); *H01M 4/134* (2013.01); *H01M 4/386* (2013.01);
(Continued)

(58) Field of Classification Search
CPC ...... H01M 4/622; H01M 4/133; H01M 4/134; H01M 4/386; H01M 4/587; H01M 4/625; H01M 4/382; H01M 4/583; H01M 4/362; H01M 4/364; H01M 4/366; H01M 4/624; H01M 4/621; H01M 2004/027; H01M 10/052
See application file for complete search history.

(56) References Cited

U.S. PATENT DOCUMENTS

| | | | | |
|---|---|---|---|---|
| 2012/0094178 A1* | 4/2012 | Loveridge | H01M 4/622 | 252/514 |
| 2016/0006024 A1* | 1/2016 | Xiao | H01M 4/0402 | 429/231.1 |
| 2018/0145317 A1* | 5/2018 | Momma | H01M 4/131 | |

FOREIGN PATENT DOCUMENTS

| | | | |
|---|---|---|---|
| CN | 109301184 | * | 2/2019 |
| GB | 2498803 | * | 7/2013 |

OTHER PUBLICATIONS

Buqa, H. et al. "Study of styrene butadiene Rubber and sodium methyl cellulose as binder for negative electrodes in lithium-ion batteries." ScienceDirect. Journal of Power Sources 161 Sep. 2006). www.elsevier.com/locate/jpowsour. pp. 617-622.

(Continued)

*Primary Examiner* — Matthew W Van Oudenaren

(57) ABSTRACT

An anode electrode comprises an anode current collector. An anode active material layer comprises anode active material comprising at least one of lithium silicon oxide, silicon oxide, lithium silicon oxide and graphite, and silicon oxide and graphite. The anode active material layer further comprises a binder comprising a mixture of styrene butadiene rubber (SBR), sodium carboxymethyl cellulose (NaCMC) and sodium polyacrylic acid (NaPAA), wherein SBR comprises greater than 60% wt of the binder.

16 Claims, 4 Drawing Sheets

(51) Int. Cl.
*H01M 4/133* (2010.01)
*H01M 4/134* (2010.01)
*H01M 4/38* (2006.01)
*H01M 4/587* (2010.01)

(52) U.S. Cl.
CPC ........... *H01M 4/587* (2013.01); *H01M 4/625* (2013.01); *H01M 2004/027* (2013.01)

(56) References Cited

OTHER PUBLICATIONS

Li, Jing, et al. "Sodium Carboxymethyl Cellulose: A Potential Binder for Si Negative Electrodes for Li-Ion Batteries". Electrochemical and Solid-State Letters, 10 (2) A17-A20 (2007).

* cited by examiner

ANODE ELECTRODE WITH ANODE ACTIVE MATERIAL LAYER INCLUDING LITHIUM SILICON OXIDE OR SILICON OXIDE AND STYRENE BUTADIENE RUBBER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery cells, and more particularly to anode electrodes including lithium silicon oxide for battery cells.

Electric vehicles (EVs) such as battery electric vehicles (BEVs), hybrid vehicles, and/or fuel cell vehicles include one or more electric machines and a battery system including one or more battery cells, modules and/or packs. A battery control module is used to control charging and/or discharging of the battery system during charging and/or driving. Manufacturers of EVs are pursuing increased power density to increase the range of the EVs.

SUMMARY

An anode electrode comprises an anode current collector. An anode active material layer comprises anode active material comprising at least one of lithium silicon oxide, silicon oxide, lithium silicon oxide and graphite, and silicon oxide and graphite. The anode active material layer further comprises a binder comprising a mixture of styrene butadiene rubber (SBR), sodium carboxymethyl cellulose (NaCMC) and sodium polyacrylic acid (NaPAA), wherein SBR comprises greater than 60% wt of the binder.

In other features, the anode active material layer further comprises a conductive filler. The conductive filler comprises first particles having an aspect ratio less than 2 and second particles having an aspect ratio greater than 20. The first particles comprise 0.1% wt to 3% wt of the anode active material layer. The first particles comprise 0.2% wt to 1% wt of the anode active material layer.

In other features, the first particles are selected from a group consisting of carbon black (CB) and acetylene black. The second particles are selected from a group consisting of graphene nanoplatelets, carbon nanofibers, multi-wall carbon nanotubes, and single-wall carbon nanotubes. The second particles comprise 0.05% wt to 2% wt of the anode active material layer.

In other features, the anode active material comprises at least one of the lithium silicon oxide and the silicon oxide, and wherein the at least one of the lithium silicon oxide and the silicon oxide comprises greater than 18% wt of the anode active material layer. The anode active material comprises 83% wt to 97% wt of the anode active material layer. The anode active material comprises 93% wt to 96% wt of the anode active material layer.

In other features, the SBR comprises 1% wt to 6% wt of the anode active material layer. The SBR comprises 1.2% wt to 3% wt of the anode active material layer. The NaCMC comprises 0.2% wt to 2% wt of the anode active material layer. The NaCMC comprises 0.3% wt to 1% wt of the anode active material layer. The NaPAA comprises 0.2% wt to 4% wt of the anode active material layer.

A battery cell comprises C cathode electrodes, A of the anode electrode, S separators, and a battery cell enclosure, where C, A and S are integers greater than one. The C cathode electrodes, the A anode electrodes, and the S separators are arranged in a predetermined sequence in the battery cell enclosure.

An anode electrode comprises an anode current collector. An anode active material layer comprises anode active material comprises at least one of lithium silicon oxide, silicon oxide, lithium silicon oxide and graphite, and silicon oxide and graphite. The anode active material layer comprises a binder comprising a mixture of styrene butadiene rubber (SBR) and sodium carboxymethyl cellulose (NaCMC). SBR comprises greater than 60% wt of the binder. A conductive filler comprises first particles having an aspect ratio less than 2 and second particles having an aspect ratio greater than 20.

In other features, the first particles comprise 0.1% wt to 3% wt of the anode active material layer, the first particles are selected from a group consisting of carbon black (CB) and acetylene black, the second particles comprise 0.05% wt to 2% wt of the anode active material layer, and the second particles are selected from a group consisting of graphene nanoplatelets, carbon nanofibers, multi-wall carbon nanotubes, and single-wall carbon nanotubes.

In other features, the anode active material comprises 83% wt to 97% wt of the anode active material layer, the SBR comprises from 1% wt to 6% wt of the anode active material layer, and the NaCMC comprises 0.2% wt to 2% wt of the anode active material layer.

In other features, the anode active material comprises at least one of the lithium silicon oxide and the silicon oxide. The at least one of the lithium silicon oxide and the silicon oxide comprises greater than 18% wt of the anode active material layer.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 2:
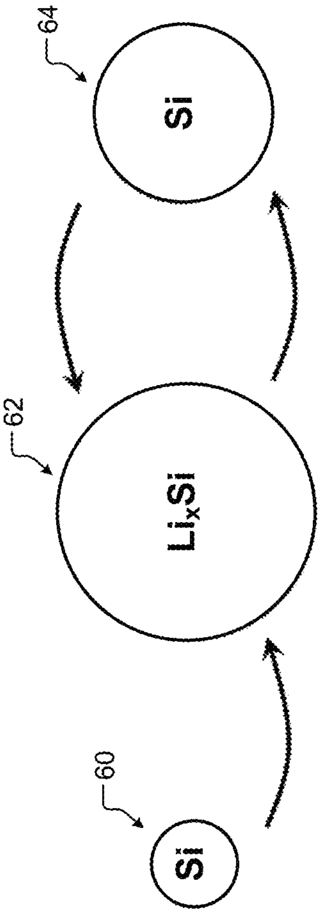
FIG. 2 illustrates expansion of silicon particles during a first lithiation event and contraction and expansion during subsequent de-lithiation and re-lithiation events, respectively.

While battery cells and anode electrodes according to the present disclosure are described in the context of electric vehicles, the battery cells and anode electrodes can be used in stationary applications and/or in other types of applications.

Battery cells include anode electrodes, cathode electrodes, and separators arranged in a predetermined sequence in an enclosure. The anode electrodes include an anode current collector and an anode active material layer arranged on one or both sides of the anode current collector. The anode active material layer includes anode active material, one or more binders, and/or one or more conductive fillers. The cathode electrodes include a cathode current collector and a cathode active material layer arranged on one or both sides of the cathode current collector. The cathode active material layer includes cathode active material, one or more binders, one or more additives, and/or one or more conductive fillers. The separators are arranged between the anode electrodes and the cathode electrodes.

As will be described further below, the anode active material layer of the anode electrodes according to the present disclosure includes a combination of active material(s), binder(s), and conductive filler(s) that optimize the processability and mechanical and electrochemical properties of the anode electrodes. In some examples, the anode active material comprises lithium silicon oxide ($LiSiO_x$), silicon oxide ($SiO_x$), lithium silicon oxide and graphite, and/or silicon oxide and graphite. In some examples, the silicon oxide comprises silicon monoxide, silicon dioxide, or silicon oxides where x is between 1 and 2 stoichiometric ratio.

In some examples, the anode active material comprises 83% wt to 97% wt of the anode active material layer. In some examples, the anode active material comprises 93% wt to 96% wt of the anode active material layer. In some examples, the $LiSiO_x$ or the $SiO_x$ comprises at least 18% wt of the anode active material layer (when $LiSiO_x$ or the $SiO_x$ are used alone or are blended with graphite or other materials).

In the anode active material layers according to the present disclosure, the binder includes styrene butadiene rubber (SBR) and/or other binder materials. In some examples, the SBR comprises greater than 60% wt of the binder. In some examples, the SBR comprises 1% wt to 6% wt of the anode active material layer. In some examples, the SBR comprises 1.2% wt to 3% wt of the anode active material layer.

In some examples, the other binder materials comprise at least one of sodium carboxymethyl cellulose (NaCMC) and sodium polyacrylic acid (NaPAA) to improve mechanical and electrochemical performance of the battery cells. In some examples, the NaCMC comprises 0.2% wt to 2% wt of the anode active material layer. In some examples, the NaCMC comprises 0.3% wt to 1% wt of the anode active material layer. In some examples, the NaPAA comprises 0.2% wt to 4% wt of the anode active material layer. In some examples, the NaPAA comprises 0.2% wt to 2% wt of the anode active material layer.

In some examples, the anode active material and the binder are combined with one or more conductive filler(s). In some examples, the one or more conductive fillers include first particles and second particles. In some examples, the first particles include one or more materials selected from a group consisting of carbon black (CB) and/or acetylene black. In some examples, the second particles include one or more materials selected from a group consisting of graphene nanoplatelets, carbon nanofibers, multi-wall carbon nanotubes, and/or single-wall carbon nanotubes.

In some examples, the first particles have an aspect ratio less than 2 (e.g., ~1) and the second particles have an aspect ratio greater than or equal to 20 (e.g., 30, 40, 60, etc.). In some examples, the first particles comprise 0.1% wt to 3% wt of the anode active material layer. In some examples, the first particles comprise 0.2% wt to 1% wt of the anode active material layer. In some examples, the second particles comprise 0.05% wt to 2% wt of the anode active material layer.

Figure 1:
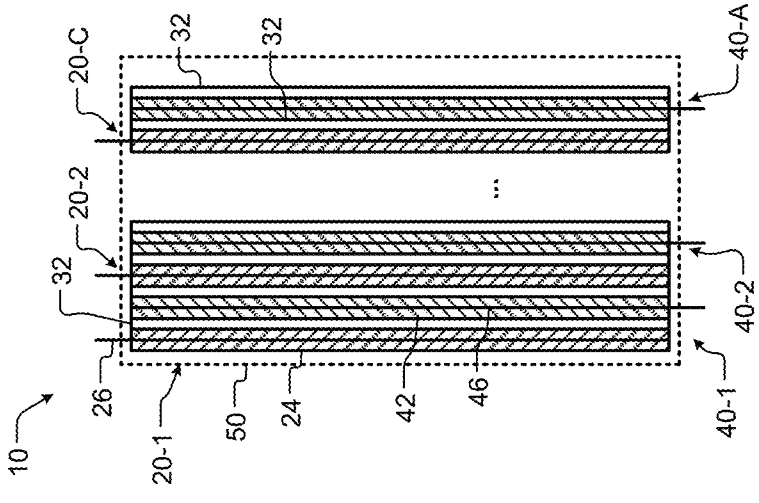
FIG. 1 is a side cross sectional view of an example of a battery cell including anode electrodes, cathode electrodes, and separators according to the present disclosure.

Referring now to FIG. 1, the battery cell 10 includes A anode electrodes, C cathode electrodes, and S separators, where A, C, and S are integers greater than one. The battery cell 10 includes C cathode electrodes 20-1, 20-2, . . . , and 20-C. The C cathode electrodes 20 include a cathode active material layer 24 arranged on one or both sides of a cathode current collector 26. The battery cell 10 includes A anode electrodes 40-1, 40-2, . . . , and 40-A. The A anode electrodes 40 include an anode active material layer 42 arranged on one or both sides of an anode current collector 46. The C cathode electrodes 20, the A anode electrodes 40, and S separators 32 are arranged in a predetermined order in an enclosure 50. For example, S separators 32 are arranged between the C cathode electrodes 20 and the A anode electrodes 40.

Referring now to FIG. 2, the anode active material includes silicon particles that expand and contract during cycling. During a first lithiation event, silicon particles 60 expand up to 3 times their original diameter as shown at 62 (lithiated silicon particles). For subsequent de-lithiation (at 64) and re-lithiation (at 62) events, the particles contract and expand, respectively, between 2 to 3 times the diameter of the silicon particles 60. The expansion and/or contraction causes stress in the active material layer of the anode electrodes.

Figure 3:
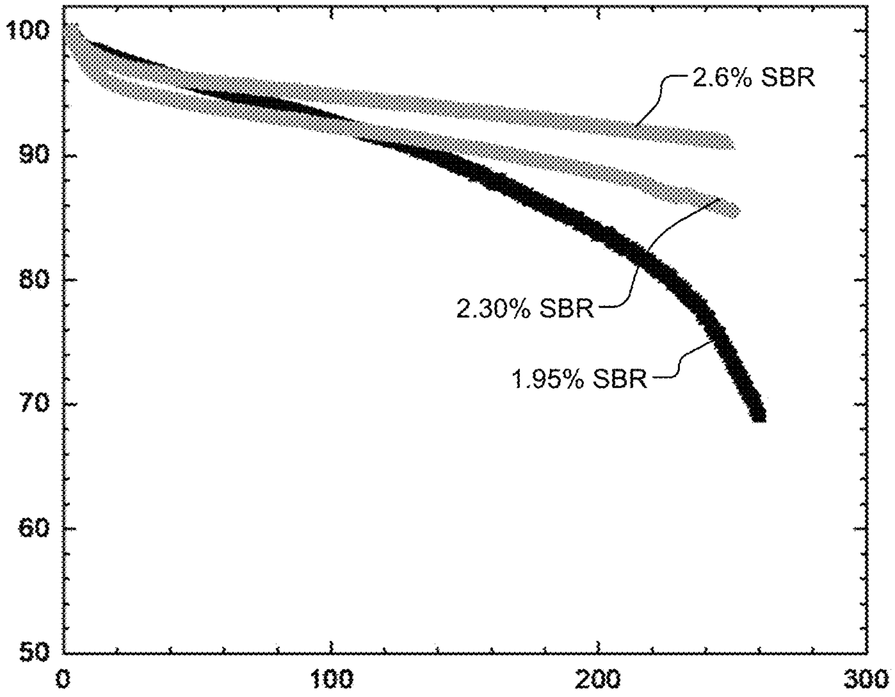
FIG. 3 is a graph illustrating capacity retention as a function of cycles for battery cells including anode electrodes with different SBR and NaCMC concentrations according to the present disclosure.
Figure 4:
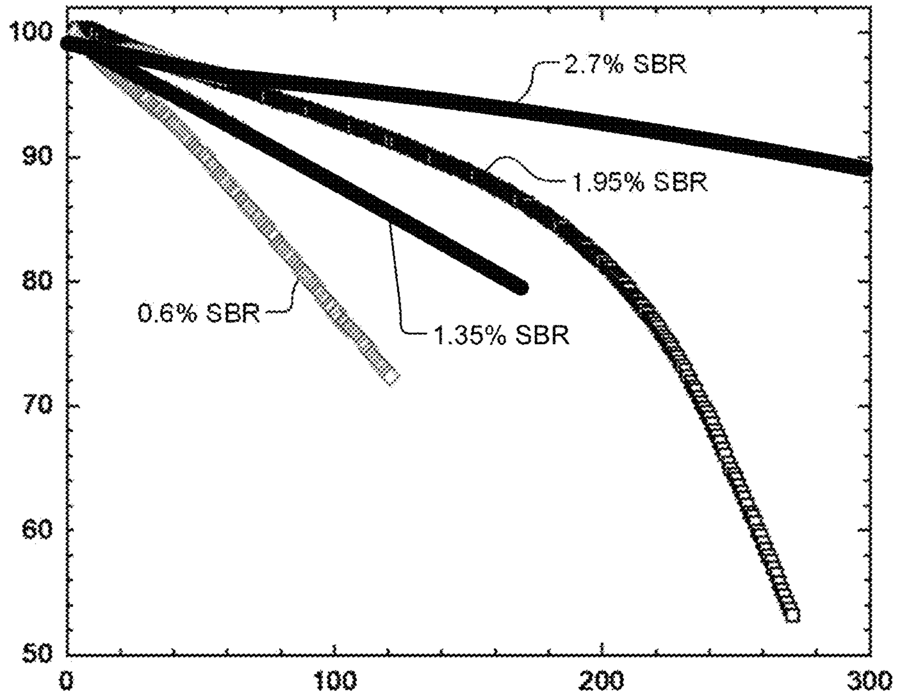
FIG. 4 is a graph illustrating capacity retention as a function of cycles for battery cells including anode electrodes with different SBR, NaCMC and NaPAA concentrations according to the present disclosure.

Referring now to FIGS. 3 and 4, capacity retention is shown as a function of cycles for anode electrodes including different concentrations of SBR, NaCMC, and/or NaPAA. In FIG. 3, the test samples include SBR and NaCMC. A first sample includes 1.3% wt NaCMC and 2.6% wt SBR. A second sample includes 1.6% wt NaCMC and 2.3% wt SBR. A third sample includes 1.95% wt NaCMC and 1.95% wt SBR. The anode active material layer in the samples comprises 57% wt graphite, 38% wt $LiSiO_x$, 3.9% wt binder, 1% wt CB, and 0.1% wt SW-CNT. In this example, all of the samples comprise 3.9% wt binder, although other binder concentrations can be used. As can be seen in FIG. 3, capacity retention increases with increasing concentrations of SBR.

In FIG. 4, the binder includes different concentrations of SBR, NaCMC, and/or NaPAA. In this example, all of the samples comprise 3.9% wt binder, although other binder concentrations can be used. A first sample includes 0.6% wt NaPAA, 0.6% wt NaCMC, and 2.7% wt SBR. A second sample includes 1.35% wt NaPAA, 0.6% wt NaCMC, and 1.95% wt SBR. A third sample includes 1.95% wt NaPAA, 0.6% wt NaCMC, and 1.35% wt SBR. A fourth sample includes 2.7% wt NaPAA, 0.6% wt NaCMC, and 0.6% wt SBR. As can be seen in FIG. 4, capacity retention increases with increasing concentrations of SBR.

Figure 5:
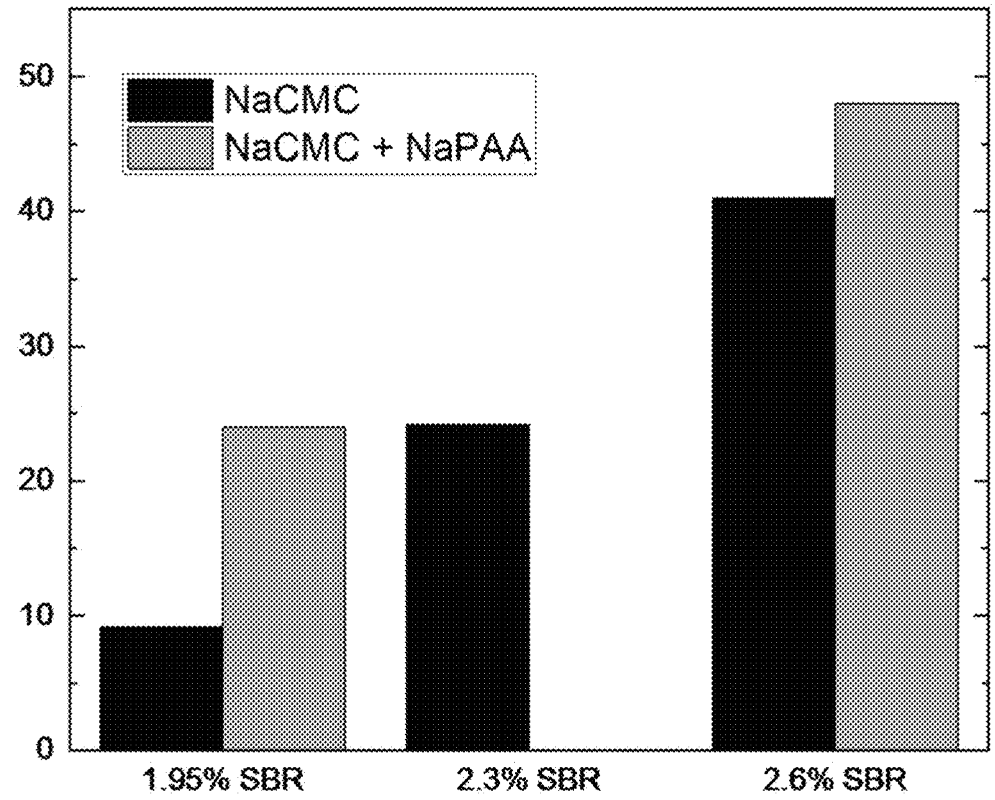
FIG. 5 is a graph illustrating peel strength for anode electrodes with different SBR, NaCMC, and/or NaPAA concentrations according to the present disclosure.

Referring now to FIG. 5, peel strength is shown for anode electrodes including different SBR, NaCMC, and/or NaPAA concentrations. SBR increases adhesion strength to the anode current collector and/or cohesion between particles. In some examples, the SBR is used in combination with either NaCMC or both NaCMC and NaPAA. In the examples in FIG. 5, all of the anode active material layers include binder comprising 3.9% wt of the anode active material layer. Generally, peel strength that is greater than 20 N/m is deemed sufficient for roll-to-roll production. As can be seen in FIG. 5, the samples including SBR at 1.95% wt and both NaCMC and NaPAA, 2.3% SBR and NaCMC (or NaCMC and NaPAA (not shown)), or SBR at 1.95% wt and either NaCMC or both NaCMC and NaPAA have a sufficient peel strength for roll-to-roll production.

Figure 6:
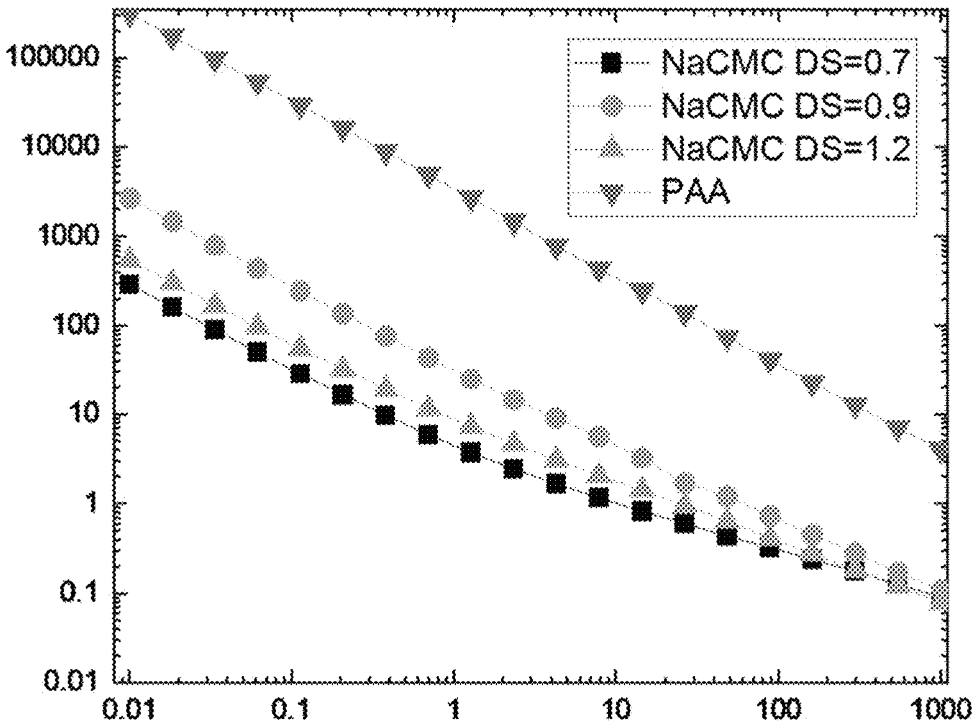
FIG. 6 is a graph illustrating viscosity as a function of shear rate for binders with different degree of substitution (DS) values according to the present disclosure.

Referring now to FIG. 6, viscosity (in pascal-second (Pa-s)) is shown as a function of shear rate for NaCMC with different degrees of substitution (DS). The NaCMC is mixed with conductive filler (e.g., acetylene black with 140 $m^2/g$ surface area at 3% wt and polymer (e.g., at 0.75% wt). NaCMC with low DS is the most effective carbon dispersant. Samples include NaCMC with DS=0.7, DS=0.9, and DS=1.2.

Lower viscosity corresponds to higher carbon dispersion, which avoids carbon agglomeration. Due to the combination of hydrophobic and hydrophilic segments of carboxymethyl cellulose (CMC), CMC is a good dispersant in water for hydrophobic carbons. This effect is exaggerated at lower degrees of substitution (DS) where the polymer has more hydrophobic segments. In some examples, the DS of the NaCMC is less than or equal to 1.0. In some examples, the DS of the NaCMC is less than or equal to 0.8.

Figure 7:
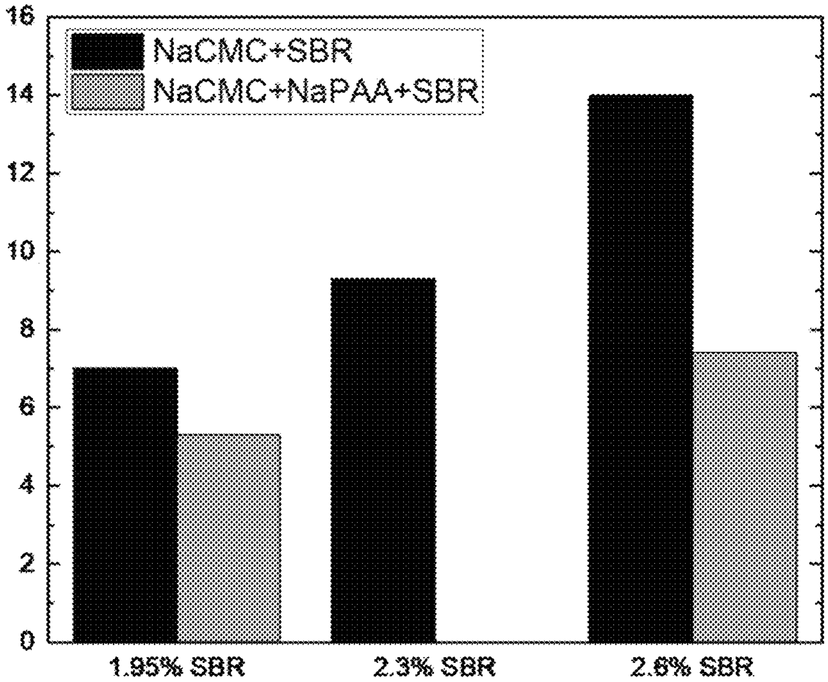
FIG. 7 is a graph illustrating ionic resistance for battery cells including anode electrodes with different SBR, NaCMC, and/or NaPAA concentrations according to the present disclosure.
Figure 8:
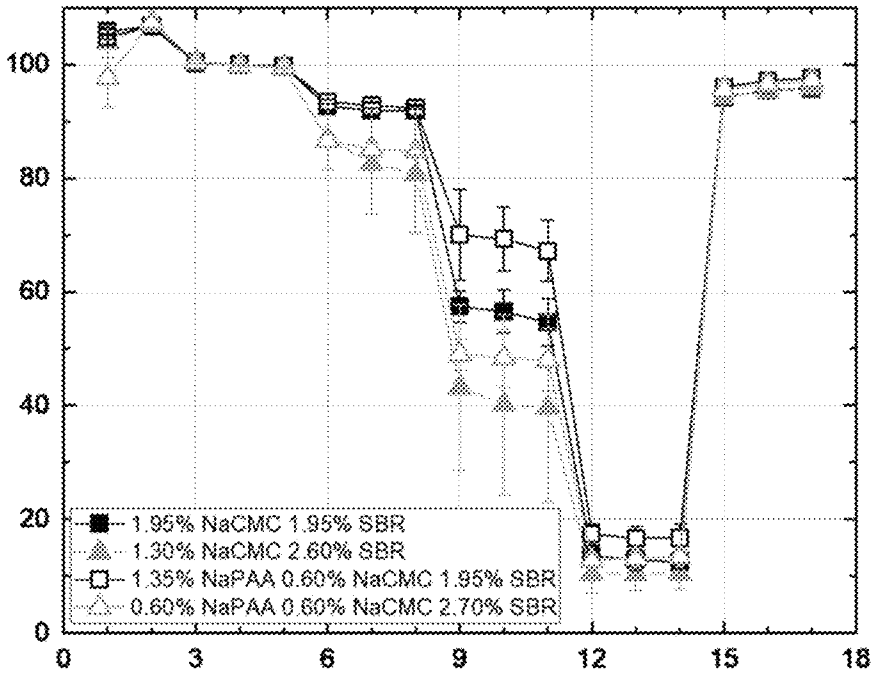
FIG. 8 is a graph illustrating capacity retention as a function of cycles for battery cells including anode electrodes with different SBR, NaCMC, and/or NaPAA concentrations according to the present disclosure.

Referring now to FIGS. 7 and 8, ionic resistance is shown for anode electrodes with different SBR, NaCMC, and/or NaPAA concentrations. Increasing the SBR concentration increases ionic resistance as shown in FIG. 7. In FIG. 8, charge retention is shown for battery cells including different concentrations of SBR, NaCMC, and/or NaPAA. Replacing some of the NaCMC with NaPAA lowers the ionic resistance and improves the rate performance without a significant impact on cycle life.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. An anode electrode comprising:

an anode current collector; and an anode active material layer comprising:

a conductive filler;

anode active material comprising a material selected from a group consisting of:

lithium silicon oxide;

silicon oxide;

lithium silicon oxide and graphite; and silicon oxide and graphite; and a binder comprising a mixture of styrene butadiene rubber (SBR), sodium carboxymethyl cellulose (NaCMC) and sodium polyacrylic acid (NaPAA), wherein SBR comprises greater than 60% wt of the binder, wherein:

the conductive filler includes first particles having an aspect ratio less than 2 and second particles having an aspect ratio greater than 20, the first particles include acetylene black, and the second particles include graphene nanoplatelets.

2. The anode electrode of claim 1, wherein the first particles comprise 0.1% wt to 3% wt of the anode active material layer.

3. The anode electrode of claim 1, wherein the first particles comprise 0.2% wt to 1% wt of the anode active material layer.

4. The anode electrode of claim 1, wherein the second particles comprise 0.05% wt to 2% wt of the anode active material layer.

5. The anode electrode of claim 1, wherein the anode active material comprises at least one of the lithium silicon oxide and the silicon oxide, and wherein the at least one of the lithium silicon oxide and the silicon oxide comprises greater than 18% wt of the anode active material layer.

6. The anode electrode of claim 1, wherein the anode active material comprises 83% wt to 97% wt of the anode active material layer.

7. The anode electrode of claim 1, wherein the anode active material comprises 93% wt to 96% wt of the anode active material layer.

8. The anode electrode of claim 1, wherein the SBR comprises 1% wt to 6% wt of the anode active material layer.

9. The anode electrode of claim 1, wherein the SBR comprises 1.2% wt to 3% wt of the anode active material layer.

10. The anode electrode of claim 1, wherein the NaCMC comprises 0.2% wt to 2% wt of the anode active material layer.

11. The anode electrode of claim 1, wherein the NaCMC comprises 0.3% wt to 1% wt of the anode active material layer.

12. The anode electrode of claim 1, wherein the NaPAA comprises 0.2% wt to 4% wt of the anode active material layer.

13. A battery cell comprising:

C cathode electrodes;

A of the anode electrode of claim 1;

S separators; and a battery cell enclosure, where C, A and S are integers greater than one, and wherein the C cathode electrodes, the A anode electrodes, and the S separators are arranged in a predetermined sequence in the battery cell enclosure.

14. An anode electrode comprising:

an anode current collector;

an anode active material layer comprising:

anode active material comprising a material selected from a group consisting of:

lithium silicon oxide;

silicon oxide;

lithium silicon oxide and graphite; and silicon oxide and graphite;

a binder comprising a mixture of styrene butadiene rubber (SBR) and sodium carboxymethyl cellulose (NaCMC), wherein SBR comprises greater than 60% wt of the binder; and a conductive filler comprising first particles having an aspect ratio less than 2 and second particles having an aspect ratio greater than 20, wherein:

the first particles include 0.1% wt to 3% wt of the anode active material layer, the first particles include acetylene black, the second particles include 0.05% wt to 2% wt of the anode active material layer, and the second particles include graphene nanoplatelets.

15. The anode electrode of claim 14, wherein:

the anode active material comprises 83% wt to 97% wt of the anode active material layer;

the SBR comprises from 1% wt to 6% wt of the anode active material layer; and the NaCMC comprises 0.2% wt to 2% wt of the anode active material layer.

16. The anode electrode of claim 14, wherein the anode active material comprises at least one of the lithium silicon oxide and the silicon oxide, and wherein the at least one of the lithium silicon oxide and the silicon oxide comprises greater than 18% wt of the anode active material layer.

* * * * *